Nov. 12, 1957 — N. MILLER — 2,813,176
THERMOSTATIC CONTROL DEVICE
Filed June 25, 1956 — 4 Sheets-Sheet 1

INVENTOR.
NICHOLAS MILLER
ATTORNEYS

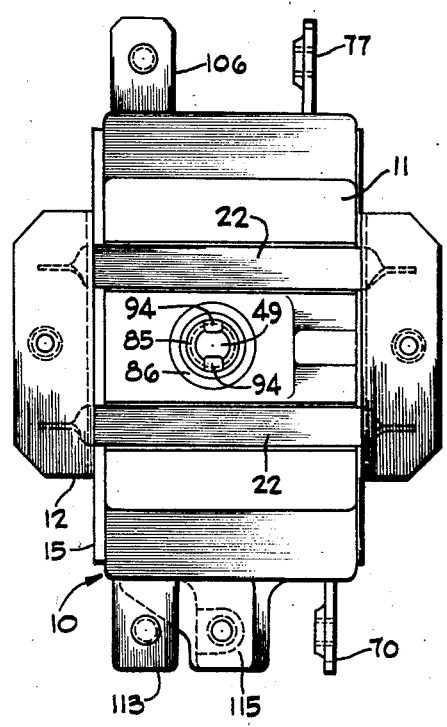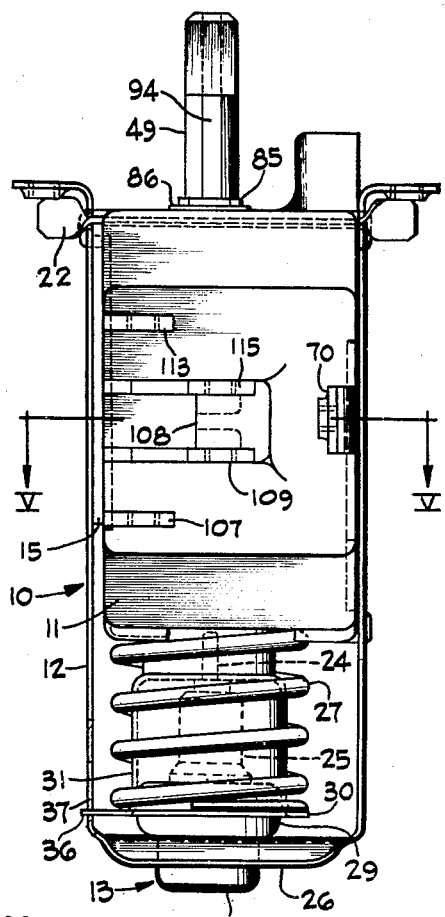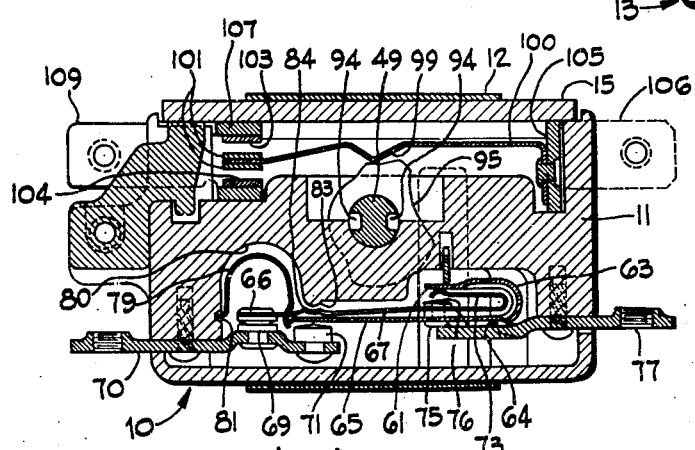

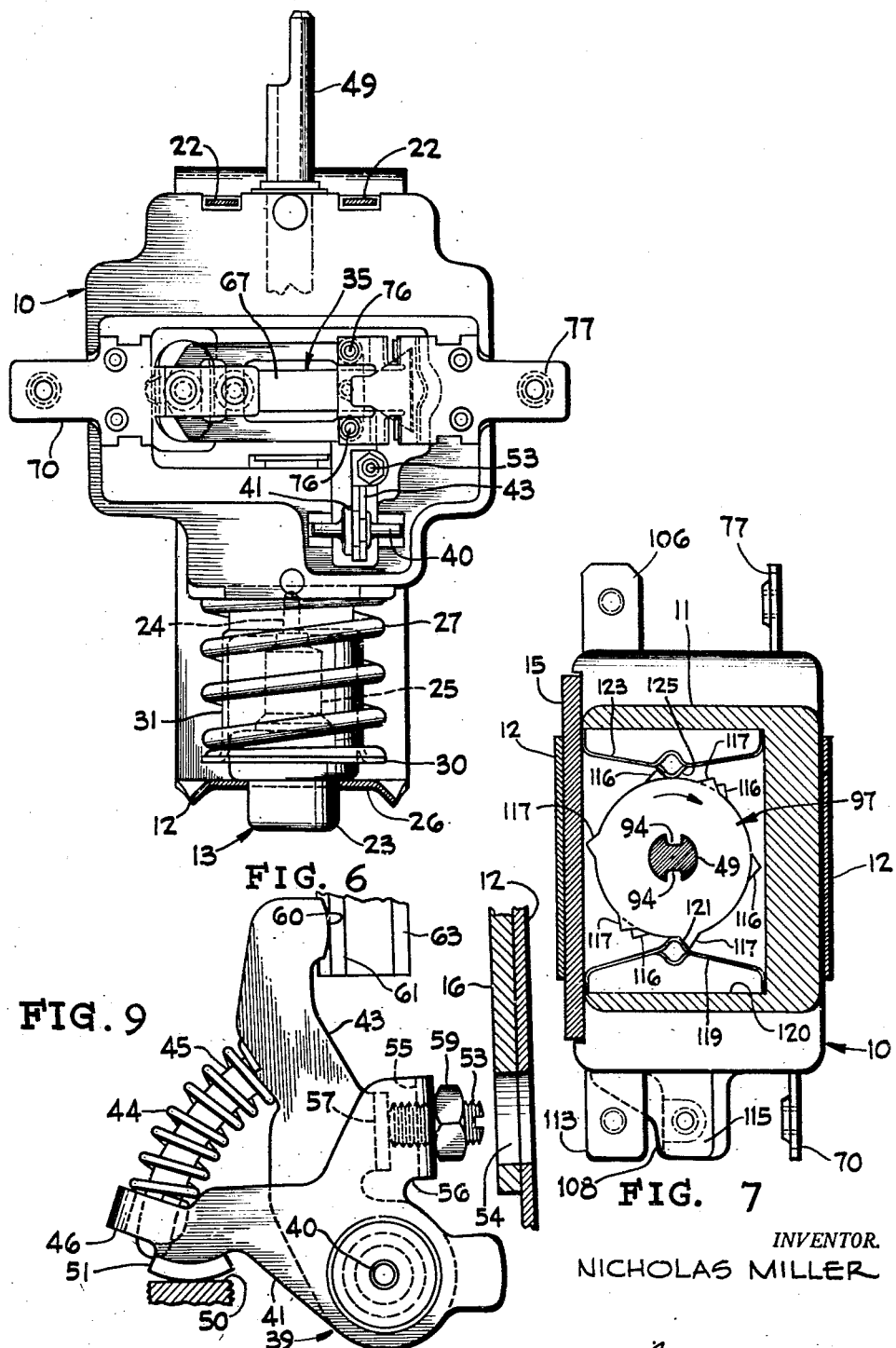

INVENTOR.
NICHOLAS MILLER

United States Patent Office 2,813,176
Patented Nov. 12, 1957

2,813,176

THERMOSTATIC CONTROL DEVICE

Nicholas Miller, Chicago, Ill., assignor to The Dole Valve Company, Chicago, Ill., a corporation of Illinois Application June 25, 1956, Serial No. 593,541

17 Claims. (Cl. 200—140)

This invention relates to improvements in thermostatic control devices and more particularly relates to such devices particularly adapted for controlling the opening and closing of a series of electrical circuits under manual selection and under thermostatic control.

A principal object of my invention is to provide a thermostatic control device particularly adapted to control a multiplicity of operations of a refrigerating device such as a room air conditioner and the like, although not limited to such use.

A further object of the invention is to provide a simple and improved thermostatic control device of a flexible construction and arrangement and designed with a view toward long life and efficient operation.

A further object of the invention is to provide a thermostatic control device having a thermostatically operated switch operating at various selected temperatures, together with a compound lever drive connection from the thermal element to the switch, preloaded to yield upon over temperature conditions and prevent damage to the operating parts of the switch.

A further object of my invention is to provide a thermostatic control device in which a switch is operated at different temperatures under the selection of the operator, and in which other switches are operated by the temperature selector for the thermostatic switch.

Still another object of the invention is to provide a simple and improved thermostatic control device including a thermostatic switch operable by extensible movement of the power member of a thermal element, in which the drive connection from the power member to the switch includes a cam member rectilinearly moved by the power member upon extensible movement thereof and turnable to vary the temperature of operation of the thermostatic switch and wherein the drive connection from the cam member to the switch is in the form of a compound lever arrangement biased in a set position and yieldable upon over temperature conditions and over travel of the power member.

A still further object of the invention is to provide a novel and improved form of thermostatic control device including a switch operated by extensible movement of the power member of a thermal element, in which the drive connection from the power member to the switch includes a cam axially moved by the power member upon extensible movement thereof and having an annular cam face with a compound lever system for driving the switch from the cam face upon rectilinear movement of the cam, spring loaded to normally form a solid drive connection but to yield upon over travel of said power member, and in which the temperature of operation of the switch is calibrated with respect to the cam by varying the spacing of the levers of the compound leverage arrangement with respect to each other.

A still further object of the invention is to provide a simple and improved form of switch requiring no insulation and connected together without the use of the usual screws.

Another and important object of the invention is to provide a novel and efficient form of snap acting switch in which the snap spring is integral with the lever for operating the switch.

A further and more detailed object of the invention is to provide a simple and improved form of snap acting switch particularly adapted to be thermostatically operated, having a snap spring and integral operating lever rockingly carried on a knife edge fulcrum, together with an integral switch blade and return spring for the lever and snap spring.

A still further object of the invention is to provide a thermostatic and manually operated switch including a switch body of such a construction that the body may readily be varied to include additional manual or thermostatically operated switches as required.

Still another object of the invention is to provide a thermostatic control device having a single knob and operating shaft operated thereby for changing the temperature range of operation of a thermostatically operated switch, and for operating a series of manually operated switches, together with a simple and novel form of off-set indexing cam for the shaft for indexing the operative positions of the switches for full turning movement of the knob for 360°.

These and other objects of the invention will appear from time to time as the following specification proceeds and with reference to the accompanying drawings wherein:

Figure 3 is a side view of the switch shown in Figure 1, with the temperature adjusting and operating knob therefor removed;

Figure 4 is a top plan view of the switch, with the operating and temperature control knob therefor removed;

Figure 5 is a sectional view taken substantially along line V—V of Figure 3;

Figure 6 is a side view of the switch shown in Figure 1, looking at the opposite side of the switch from Figure 1, with the switch cover removed and with the support for the thermal element shown in section;

Figure 7 is a sectional view taken substantially along line VII—VII of Figure 1;

Figure 9 is an enlarged detailed view showing the compound leverage arrangement for operating the thermostatically operated switch from the thermal element therefor.

Figure 8:
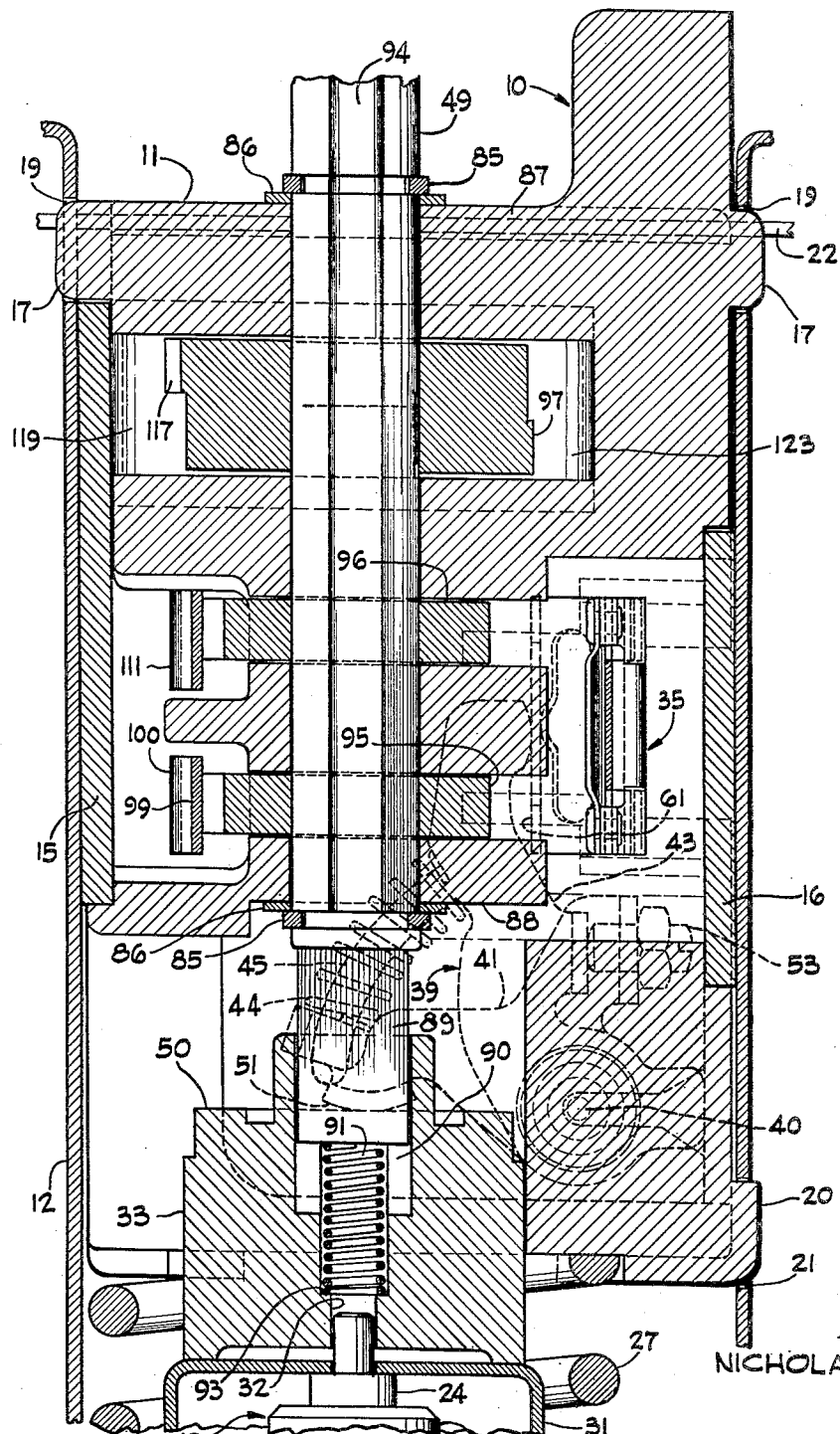
Figure 8 is a fragmentary sectional view taken substantially along line VIII—VIII of Figure 1.

In the embodiment of the invention illustrated in the drawings, I have shown a switch casing 10 including a switch body 11, preferably made from an insulating material, such as Bakelite and the like. I have also shown a support 12 for a thermal element 13 extending along opposite sides of the switch body and retaining switch plates 15 and 16 thereto, as is best shown in Figure 8.

The support 12 for the thermal element 13 is shown as being generally U-shaped in form when assembled to the switch, and is preferably made from a spring metal, the opposite legs of which are normally sprung apart and are retained to opposite side walls of the body 11 by registry of projecting bosses 17 projecting from opposite side walls of the body 11 adjacent the upper end thereof with apertured portions 19 of the support 12, and by registry of a boss 20 projecting from one side wall of the body 11, adjacent the lower end thereof, with an apertured portion 21 in one leg of the support frame for the thermal element 13. The side walls of the support 12 may be pressed into engagement with the opposite side walls of the body 11 and with the switch plates 15 and 16, and are retained in engagement therewith by spaced metallic strips 22 extending across the switch body and recessed therein and having opposite ends twisted to retain the support 12 to said switch body.

The thermal element 13 is shown as being a solid fill or power type of thermal element operating on principles similar to those shown and described in Patent No. 2,368,-181 which issued to Sergius Vernet on January 30, 1945. In such types of thermal elements a fusible material contained within a casing 23 for the element, reacts against a flexible membrane (not shown) upon the increase in temperature to the fusion point of the fusible thermally expansible material, to extend a piston 24 from a cylinder 25 of the thermal element.

The casing 23 of the thermal element 13 is shown as extending through an open portion of a bridge 26 of the support 12, connecting the legs of the support together, and as being retained thereto by a return spring 27 for the thermal element, retaining a clamping ring 29 encircling the casing 23 into abutting engagement with the bridge 26.

The return spring 27 is seated at one end on a flange 30 of a generally bell-like retainer 31 for the thermal element, and is seated at its opposite end on the under side of the switch body 11. The power member or piston 24 of the thermal element is shown as being stepped, with the reduced diameter upper end portion thereof extending through the central top portion of the retainer 31, within a central apertured portion 32 of a temperature adjusting cam 33, operable to adjust the temperature of operation of a snap acting switch 35, as will hereinafter more clearly appear as this specification proceeds.

The underside of the top of the retainer 31 rests on the shoulder of the stepped power member 24, to retractibly move said power member as the temperature is reduced, and to bias the clamping ring 29 into engagement with the transverse bridge 26. The outer side of the retainer for the thermal element and seat for the spring 27 is shown as having abutting engagement with the cam 33, for rectilinearly moving said cam along the switch body 11 upon extensible movement of the power member 24 with respect to the cylinder 25, as the temperature reaches the operating range of the thermal element 13. The flange 30 of the retainer 31 is shown in Figure 3 as having an ear 36 projecting therefrom and slidably guided in a slot 37 extending vertically along one leg of the support 12.

The drive from the cam 33 to the snap switch 35 includes a compound lever 39 mounted on a rock shaft 40, suitably supported in the switch body 11. The compound lever 39 includes levers 41 and 43 pivoted on the shaft 40 for movement with respect to each other and connected to operate together by a compression spring 44. The compression spring 44 encircles and extends along an arcuate guide prong 45 extending from the lever 43 and having slidable engagement with the aperture of an apertured lug 46, extending from the lever 41. The spring 44 is normally loaded to act as a positive drive member, and to yield upon over travel of the power member 24 and cam 33 which may be caused by excessive temperature conditions, to prevent damage to the snap acting switch 35.

The cam 33 is turned by a dial knob 47 on the shaft 49, operatively connected with said cam, to vary the position of an annular cam face 50 thereof with respect to a follower shoe 51 of the lever 41.

The spring 44 is preloaded and the spacing between the levers 41 and 43 is calibrated with respect to the annular cam face 50 of the cam 33, by a calibrating screw 53 within the switch casing, and accessible from the outside thereof through aligned apertures 54, formed in the switch plate 16 and in a leg of the thermostat support frame 12. The set screw 53 is shown as being threaded in a ledge 55 extending laterally from an upwardly and outwardly projecting arm 56 of the lever 41, and as abutting a ledge 57 extending laterally from the lever 43 intermediate its ends. A lock nut 59 is provided to lock the set screw 53 in position when the cam 33 has been calibrated. The proper spacing of the levers 41 and 43 may thus be attained to operate the switch 35 by the cam 33 at a selected temperature adjustment position of the dial knob 47.

The lever 43 has an engaging end portion 60 engageable with a leg 61 of a generally U-shaped lever 63, fulcrumed on its opposite leg adjacent the base of the U on a knife edge fulcrum 64. Movement of the lever 43 toward the fulcrum 64 will pivot the lever 63 and an integral snap spring arm 65 extending from the lower leg thereof, in a direction to effect the engagement of a movable contact 66 on a spring switch arm or blade 67 with a stationary contact 69. The stationary contact 69 is on a terminal 70 extending through the switch body 11 and suitably secured to the wall thereof intermediate the ends of said terminal. The terminal 70 extends inwardly beyond the stationary contact 69 and has a stop 71 on the end thereof, limiting pivotal movement of the snap spring 65 and switch blade 67. The stop 71 may be made from insulating material such as nylon and limits the temperature amplitude or on-off differential of the thermostatic switch.

The lever 63 and snap spring arm 65 are snapped in a direction to disengage the movable contact 66 from the stationary contact 69, upon predetermined reductions in temperature and retractible movement of the power member 24 with respect to the cylinder 25, by a return spring 73 formed integrally with the switch arm or blade 67 and extending within the lever 63 and having engagement within the leg 61 thereof. The return spring 73 is U-shaped in form and generally conforms to the form of the lever 63. The return spring 73 and switch blade 67 are wider than the snap spring arm and lever 63 and have open central portions opening to said snap spring arm and are secured to stationary lugs 75 positioned substantially in alignment with the inner end of the upper leg of the return spring 73, as by rivets 76. The stationary lugs 75 are shown as projecting from the inner end of a terminal 77 secured intermediate its ends to the end wall of the switch body 11 and projecting outwardly through said switch body for attachment to an electrical conductor (not shown).

The spring arm 65 is engaged at its free end with the end of a uniform stress spring 79, shown in Figure 5 as being generally U-shaped in cross-section and extending within a cavity 80 formed in the switch body. The opposite end of the uniform stress spring 79 from the spring blade 65 has rocking engagement within a recess 81 formed in a wall of the switch body 11 forming a wall of the cavity 80 spaced in advance of the end of the switch blade 65. The spring 79 acts as an over-center spring and besides holding the contacts 66 and 69 in their engaged and disengaged positions exerts a substantially constant force on the end of the snap spring arm 65, to cause said snap spring arm to snap the contacts into open and closed positions. A stop projection 83 extends from the inner margin of the cavity 80 and is adapted to be engaged by a central recessed portion 84 of the switch blade 67. The switch blade 67 is preferably made from a spring material having good electrical conductivity, such as commercial bronze or beryllium copper, and is biased into engagement with the inner face of the snap spring 65 so as to follow said snap spring arm upon rocking movement thereof and of the lever 63 about the knife-edge fulcrum 64.

The shaft 49 is rotatably carried in the switch body 11 and is retained thereto as by snap rings 85 snapped to said shaft into engagement with bearing washers 86 abutting opposite faces 87 and 88 of the switch body. The face 88 is shown as being spaced inwardly from the lower end of the switch body and as having a flat portion 89 of the shaft 49 extending therefrom within an elongated socket 90 formed in the cam 33 and opening to the inner side thereof, for rotating said cam upon turning movement of the shaft 49. The socket 90 opens into the apertured portion 32. A spring 91 is interposed between the end of the shaft 49 and a shoulder 93 of the apertured portion 32 to maintain the cam 33 in engagement with the top surface of the retainer 31 upon retractible movement of the power member 24 with respect to the cylinder 25.

The shaft 49 also has two diametrically opposed keyways 94 extending therealong, and having spaced cams 95 and 96 and an index wheel or cam 97 keyed thereto and rotated thereby. The cam 95 is shown in Figure 5 as engaging an intermediate peaked portion 99 of a double throw switch arm 100 having oppositely facing contacts 101 on the free end thereof, for moving said switch arm to engage the contact 101 with a stationary contact 103 and accommodating said switch arm to engage the oppositely facing contact 101 with a stationary contact 104, upon turning movement of said cam. The opposite end of the switch arm 100 from the contacts 101 is turned at right angles to the main body of the arm and is riveted or otherwise secured to an inturned end 105 of a terminal 106.

The contact 103 is shown as being carried by the inner end portion of a terminal 107 carried by the cover 15 and extending outwardly of the switch body to one side of the cover 15. The contact 104 is carried on a terminal 109 extending outwardly from the switch body and spaced from the terminal 107.

In a like manner the cam 96 has engagement with a yieldable switch arm 111 secured to the inturned end or leg 105 of the terminal 106 at one end, and having contacts (not shown) on opposite sides of its other end, engageable with a contact 112 on the inner end portion of a terminal 113 like the terminal 107 or with a suitable contact (not shown) on the inner end portion of a terminal 115 spaced from the terminal 109 by an insulating block 108.

Figures 1, 2:
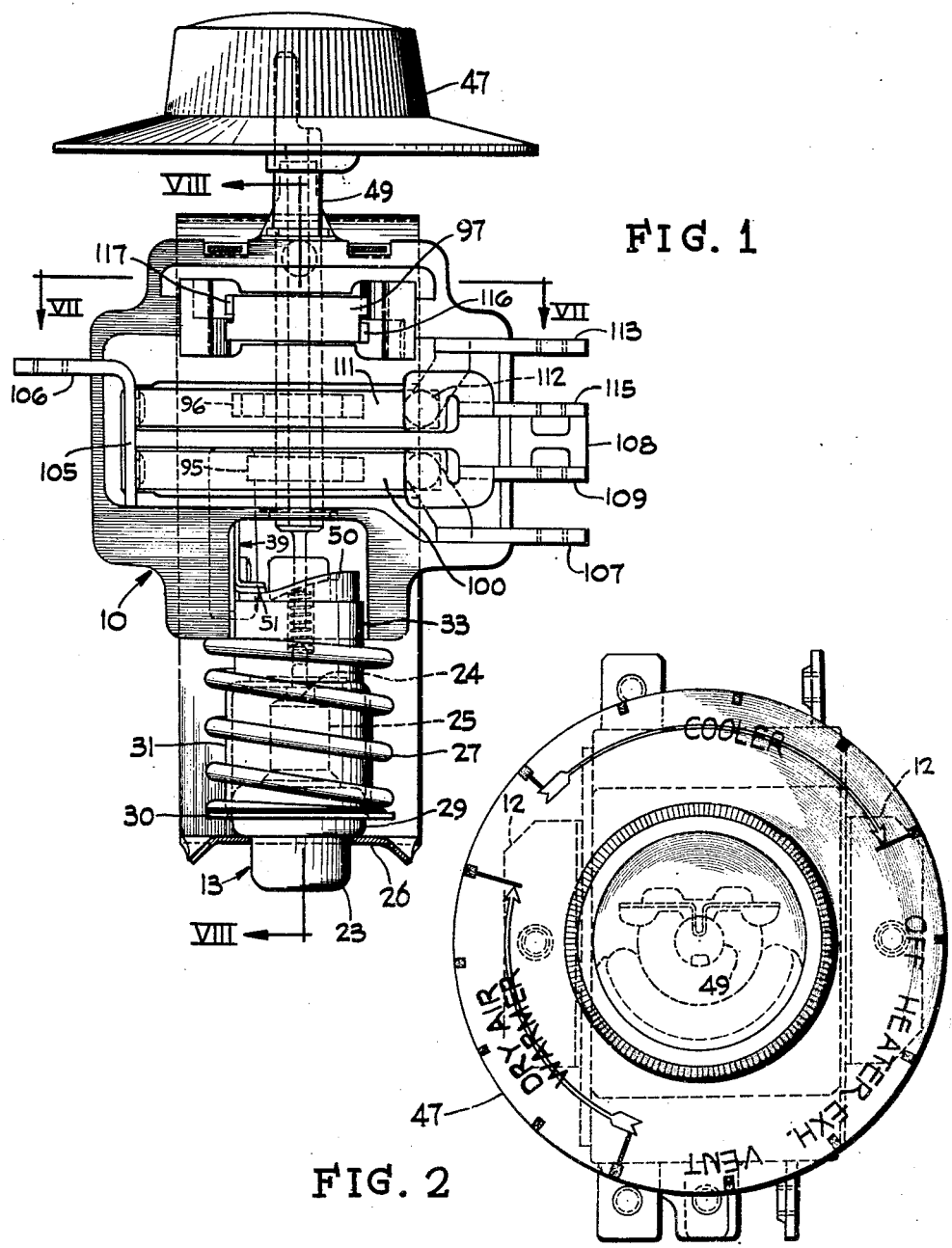
Figure 1 is a view in side elevation of a switch constructed in accordance with the invention, with one of the end covers for the switch removed and with the support for the thermal element shown in section.
Figure 2 is a top plan view of the switch shown in Figure 1.

It may be seen from Figure 1 that the cams 95 and 96 are out of phase with respect to each other to effect the completion of circuits through the switch arms 100 and 111 and either of the terminals 107 or 113 or 109 or 115 as selected by turning movement of the shaft 49 and dial knob 47. For example, the switch arm 99 may be moved to engage one contact thereof with the contact 103 to energize the compressor motor of a room air conditioner when in one position of the cam 95, and may be engaged with the contact 104 to energize the heater of the air conditioner when in another position of the cam 95. The switch arm 111 may also be moved by its cam 96 to complete a circuit through the terminal 113 when in one position of said switch arm to energize a fan motor to drive the fan at one speed and may be moved to complete a circuit through the terminal 115 in another position of the cam 96 to energize the fan motor and effect the driving of the fan at a different speed.

It may here be seen that while I have shown two cams 95 and 96 and switch arms 100 and 111 operated thereby at predetermined positions of the dial knob 47 and shaft 49, that the construction of the drive to the cams 95 and 96 for operating the switch arms is such that any desired number of cams may be placed on the shaft 49 for operating additional switch arms and adapting the thermostat to the various operations required by a particular air conditioner or like apparatus, merely by lengthening the switch body 11 and the shaft 49, with no change in the thermal element and operating connection therefrom, to operate the snap acting switch 35.

The flexibility of the thermostat is also increased by the use of the indexing cam 97 having indexing projections or peaks 116 at a lower level and indexing peaks 117 at a higher level and spaced about the cam circumferentially of the peaks 116. As shown in Figure 7, an indexing spring 119 is retained in a cavity 120 formed in the switch body 11 and has an intermediate inwardly projecting peaked engaging portion 121, engageable with the peaks 117 on the indexing cam 97. A diametrically opposed indexing spring 123 portion is also carried in a cavity 120 and has an intermediate peaked indexing portion 125 disposed at a lower level than the indexing portion 121 and engaging the peaks 116 of the indexing cam 97.

Upon turning movement of the dial knob 47 to turn the shaft 49 and indexing cam 97, at certain positions of said dial knob, a peak 117 will come into engagement with an indexing portion 121 of the index spring 119. At the same time a diametrically opposed peak 116 will come into engagement with the indexing portion 125 of the index spring 123. This will balance the forces on the cam 97 and shaft 49 and will indicate a position of either of the cams 95 or 96 or the cam 33. Upon further turning movement of the index cam 97 other positions of the cams 95, 96 or 33 will be indicated in an obvious manner.

The indexing springs 119 and 123 besides indexing the positions of the dial knob 47 and a cam 95 or 96 or 33 also yield upon engagement by the indexing peaks 116 and 117 and serve to snap the cam 97 past a position where the peaks 116 and 117 engage the indexing portions 121 and 125 of the index springs 119 and 123. This will accelerate operation of the switches operated by the cams 95 and 96 with the resultant prevention of arcing and burning of the contacts of the switches. The indexing springs 119 and 123 engaging the cam 97 between the peaks 116 and 117 also serve to hold the dial knob 47 and parts operated thereby in the position to which they are adjusted by the dial knob 47. The indexing springs 119 and 123 thus provide balanced forces on the cam 97 and shaft 49 and serve to index the positions of said cam and the cams 95, 96 or 33 operated thereby for substantially 360° of rotation of the dial knob 47, if desired. The indexing springs also serve to hold the index cam 97 and the double throw switch arms 100 or 111 and the thermostatic cam 33 in a desired operative and adjusted position as indicated on the face of the dial knob, in cooperation with indicia marks (not shown), which may be on the mounting plate for the switch.

It should be understood that while the indexing cam 97 is shown as being provided with peaks 116 and 117, that it may be provided with indentations as well, which will not only enable the operator to feel the position of the cam but also will prevent too slow closing of the switches operated by the cams 95 and 96.

It will be understood that various modifications and variations of the present invention may be effected without departing from the spirit and scope of the novel concepts thereof.

I claim as my invention:

1. In a thermostatic switching device, a switch casing, a switch mounted in said casing, thermal means associated with said casing for operating said switch and having a power member extensible upon predetermined rises in temperature, a cam member engaged by said power member and rectilinearly moved thereby upon predetermined temperature rises, said cam member having a cam face concentric with said power member and turnable with respect thereto, to adjust the temperature of operation of said switch, a compound lever having one arm engageable with said cam face and another arm relatively movable with respect to said one arm and having operative engagement with said switch, and means yieldably connecting said arms to move together and accommodating one arm to yield with respect to the other upon over travel of said cam member, caused by over temperature conditions.

2. In a thermostatic switching device, a switch casing, a switch mounted in said casing, thermal means associated with said casing for operating said switch and having a power member extensible upon predetermined rises in temperature, a cam member rectilinearly moved by said power member upon predetermined temperature rises, said cam member having a cam face concentric with said power member, means for turning said cam face to vary the temperature of operation of said switch, a compound lever connecting said cam member with said switch and having one arm engageable with said cam face, a second arm engageable with said switch for operating the same, means yieldably connecting arms to move together and accommodating one arm to yield with respect to the other upon over temperature conditions, and means adjusting the angular relation of said arms with respect to each other to calibrate the temperature of operation of said switch in accordance with certain positions of said cam means.

3. In a thermostatic switching device, a switch casing, a switch mounted in said casing, thermal means associated with said casing for operating said switch and having a power member extensible upon predetermined rises in temperature, an operative connection between said power member and said switch comprising a compound lever having two lever arms movable about a common pivot, one being operated by extensible movement of said power member and the other having operative engagement with said switch, a compression spring interposed between said levers to effect movement of said levers together in a switch operating direction, and a calibrating screw threaded in one of said levers and having abutting engagement with the other of said levers for preloading said spring and varying the angular relation of said levers with respect to each other, for calibrating the temperature of operation of said switch in accordance with operation of said thermal means.

4. In a thermostatic switching device, a switch casing, a switch mounted on said casing, thermal means associated with said casing for operating said switch and having a power member extensible upon predetermined rises in temperature, a cam member rectilinearly moved by said thermal means upon predetermined temperature rises and having an annular cam face concentric with said thermal means, a compound lever having two lever arms movable about a common pivot, one having engagement with said cam face and the other having operative engagement with said switch, a prong projecting from one of said levers and slidably guided in the other of said levers, a spring encircling said prong and interposed between said levers, and means for preloading said spring and varying the angular relation of said levers with respect to each other to calibrate operation of said switch with respect to selected positions on said cam face.

5. A thermostatic switching device comprising a switch casing, a switch mounted in said casing, thermal means carried by said casing and having a power member extensible within said casing upon predetermined increases in temperature, a cam member rectilinearly moved by said power member upon predetermined increases in temperature, said cam member having an annular cam face extending about said power member and being adjustable about the axis of said power member to vary the temperature of operation of said switch, a compound lever connecting said cam member to said switch and comprising two levers pivoted to move about a common axis, a preloaded spring connecting said levers to move together in a direction to operate said switch, one lever having slidable engagement with said cam member and the other lever having operative engagement with said switch, a knob on the outside of said casing and a shaft turned thereby for turning said cam member to vary the temperature of operation of said switch, and a calibrating screw threaded in one of said levers and having engage-
ment with the other of said levers for varying the angular relation of said levers with respect to each other and calibrating the temperature of operation of said switch with respect to predetermined positions of said knob and cam member.

6. In a combination manual and thermostatic switching device, a switch casing, a plurality of switches mounted in said casing, thermostatic means associated with said casing for operating one of said switches and having an extensible power member, a compound lever operated by said power member and connecting said thermostatic means to said one switch to operate the same, said compound lever being yieldable to prevent damage to said switch upon over travel of said thermal means, adjustment means for varying the temperature of operation of said switch by said thermal means, and means on said adjustment means for operating another of said switches upon turning movement of said adjustment means.

7. In a manual and thermostatic switching device, a switch casing, a plurality of switches mounted in said casing, a thermal element carried by said switch casing and having a power member extensible upon predetermined rises in temperature, a cam having an annular cam face coaxial with the axis of said power member and moved along said casing in one direction by said power member upon extensible movement thereof, spring means moving said cam and power member along said casing in an opposite direction, a shaft coaxial with said cam and having driving engagement therewith for turning said cam upon turning movement of said shaft, two levers movable about a common axis, one riding on said cam and rocked thereby upon rectilinear movement thereof and the other having engagement with one of said switches for operating said switch upon rocking movement of said first lever, a spring connected between said levers and loaded to provide a positive drive connection between said levers under normal operating conditions, means varying the spacing of said levers to calibrate the temperature of operation of said switch with respect to a position of said annular cam face, means operated by turning movement of said shaft for operating other of said switches, and means indexing the operative condition of said switches upon turning movement of said knob and shaft comprising an indexing cam on said shaft having indexing peaks spaced therearound on two levels and indexing springs successively engageable with said peaks upon turning movement of said knob and shaft to index the condition of said switches for substantially 360° of rotation of said knob and shaft.

8. In a manual and thermostatic switching device, a switch casing, a plurality of switches mounted in said casing, a thermal element carried by said switch casing and having a power member extensible upon predetermined rises in temperature, a cam having an annular cam face coaxial with the axis of said power member and moved along said casing in one direction by said power member upon extensible movement thereof, spring means moving said cam and power member along said casing in an opposite direction, a shaft coaxial with said cam and having driving engagement therewith for turning said cam upon turning movement of said shaft, two levers movable about a common axis, one riding on said cam and rocked thereby upon rectilinear movement thereof and the other having engagement with one of said switches for operating said switch upon rocking movement of said first lever, a spring connected between said levers and loaded to provide a positive drive connection between said levers under normal operating conditions, means varying the spacing of said levers to calibrate the temperature of operation of said switch with respect to a position of said annular cam face, at least one additional cam on said shaft for operating another of said switches upon turning movement of said shaft, and a plural level indexing cam on said shaft having indexing members engageable therewith at different phases in the cycle of rotation thereof for indexing the condition of another of said switches throughout the cycle of rotation of said shaft for substantially 360°.

9. In a manual and thermostatic switching device, a switch casing, a plurality of switches mounted in said casing, a thermal element carried by said switch casing and having a power member extensible upon predetermined rises in temperature, a cam having an annular cam face coaxial with the axis of said power member and moved along said casing in one direction by said power member upon extensible movement thereof, spring means moving said cam and power member along said casing in an opposite direction, a shaft coaxial with said cam and having driving engagement therewith for turning said cam upon turning movement of said shaft, two levers movable about a common axis, one riding on said cam and rocked thereby upon rectilinear movement thereof and the other having engagement with one of said switches for operating said switch upon rocking movement of said first lever, a spring connected between said levers and loaded to provide a positive drive connection between said levers under normal operating conditions, means varying the spacing of said levers to calibrate the temperature of operation of said switch with respect to a position of said annular cam face, a plurality of additional cams spaced along said shaft and operated thereby upon turning movement thereof for operating other of said switches, drive connections from said cams to said other switches for operating said switches upon turning movement of said shaft, a knob on said shaft for turning said shaft and first mentioned cam to the temperature range of operation of said first mentioned switch and to turn said second mentioned cams to open and close said other switches independently of said thermal operated switch.

10. A snap acting switch comprising a switch casing, an integral spring and lever having an elongated spring blade extending along said casing having a free end portion and having an opposite inturned end portion extending parallel with said blade for a minor portion of the length thereof, a knife edge support for said blade adjacent said inturned end portion, an actuator for said lever engageable with said inturned end portion adjacent the free end thereof, a switch blade and return spring extending along said lever beyond the free end of said spring blade, said switch blade and return spring being fixed to said casing intermediate the ends thereof and having an inturned end portion extending within said inturned end portion of said lever and biasing said lever into engagement with said actuator and having a switch blade extending beyond the end of said snap spring, and a constant stress spring generally U-shaped in form when stressed and having rocking connection with said casing in advance of said snap spring and also having rocking engagement with the free end of said snap spring.

11. A snap acting switch comprising a switch casing, a stationary contact within said casing adjacent one end thereof, a knife edge fulcrum within said casing adjacent the opposite end thereof, a snap spring and lever fulcrumed on said knife edge fulcrum and extending along said casing to a position adjacent said stationary contact, said snap spring and lever having an inturned lever portion extending from said fulcrum in a direction away from said contact and turned inwardly to extend along said snap spring for a short portion of the length thereof in a direction toward said contact, an actuator engaging the inturned end portion of said lever for rocking said lever and snap spring in one direction, a constant stress spring generally U-shaped in form and having rocking engagement with said casing on the opposite side of said contact from said snap spring and also having rocking engagement with said snap spring on the end thereof, and a switch blade fixed to said casing adjacent said fulcrum and extending along and beyond said snap spring and biased into engagement therewith and having a contact on the free end thereof engageable with stationary contact, and also having a portion engageable with said lever and biasing said lever into engagement with said actuator and moving said lever and snap spring in a direction to open said contacts upon release of said actuator from said lever.

12. A snap acting switch comprising a switch casing, a stationary contact within said casing adjacent one end thereof, a knife edge fulcrum within said casing adjacent the opposite end thereof, a snap spring and lever fulcrumed on said knife edge fulcrum and extending along said casing to a position adjacent said stationary contact, said snap spring and lever having an inturned lever portion extending from said fulcrum in a direction away from said contact and turned inwardly to extend along said snap spring for a short portion of the length thereof in a direction toward said contact, an actuator engaging the inturned end portion of said lever for rocking said lever and snap spring in one direction, a constant stress spring generally U-shaped in form and having rocking engagement with said casing on the opposite side of said contact from said snap spring and also having rocking engagement with said snap spring on the end thereof, and a switch blade fixed to said casing adjacent said fulcrum and extending along and beyond said snap spring and biased into engagement therewith and having a contact on the free end thereof engageable with a stationary contact, said switch blade having a return spring portion from its point of fixed connection to said casing within said inturned portion of said lever and having engagement with said inturned portion of said lever adjacent said actuator, for biasing said lever in a direction to move said snap spring to disengage said contacts upon release of said actuator from said lever.

13. In a thermostatic switch, a switch casing comprising a body of insulating material and having a plurality of switches carried thereby, a thermal element having a power member extending within said body for operating at least one of said switches, and means for retaining said thermal element to said body comprising a metallic support frame having a bridge spaced from an end of said body and extending thereacross and carrying said thermal element, and having opposite legs extending along said switch body and having interengagement therewith at spaced points, locking strips extending across said body at the opposite end thereof from said thermal element and extending through said legs and twisted to retain said legs to said body, and a return spring for said thermal element seated on said body and reacting against said power member and retaining said thermal element to said bridge.

14. In a thermostatic switch, a switch casing comprising a body made from insulating material and having spaced cavities therein opening to opposite sides thereof, a plurality of switches in said cavities, insulating switch plates for said cavities and switches, a thermal element having a power member extensible within said body for operating at least one of said switches upon predetermined rises in temperature, and means for retaining said switch plates to close said cavities and for retaining said thermal element to said body comprising a metallic frame having a bridge carrying said thermal element and having spaced legs biased to flex away from each other and extending along said opposite sides of said body into engagement with said switch plates, securing strips extending across the opposite end of said body from said thermal element through said legs and twisted to retain said legs to said body, and means maintaining tension on said securing strips comprising a return spring for said thermal element seated on said body at the end thereof opposite from said securing strips and connected with said power member, and biasing said power member in a return direction and said thermal element into engagement with said bridge.

15. In a switch, a switch casing, a plurality of switches within said casing, a shaft having spaced cams thereon for operating said switches, a knob on said shaft, means accommodating turning movement of said knob and shaft for substantially 360° for operating said switches in a predetermined sequence and indicating the operative positions of said switches during full rotation of said knob, comprising an indexing cam on said shaft having circumferentially spaced indexing portions on two levels around the face of said indexing cam, and spaced indexing members yieldably engaged with said indexing portions upon turning movement of said cam, one indexing member engaging said indexing portions on one level and the other indexing member engaging other of said indexing portions on a different level.

16. In a switch, a switch casing, a plurality of switches within said casing, a shaft having spaced cams thereon for operating said switches, a knob on said shaft, means accommodating turning movement of said knob and shaft for substantially 360° for operating said switches in a predetermined sequence and indicating the operative positions of said switches during full rotation of said knob, comprising an indexing cam on said shaft having circumferentially spaced indexing portions on two levels around the face of said indexing cam, and spaced indexing members yieldably engaged with said indexing portions upon turning movement of said cam, one indexing member engaging said indexing portions on one level and the other indexing member engaging other of said indexing portions on a different level, and comprising diametrically opposed indexing springs carried in said casing having yieldable indexing end portions for successively engaging said indexing portions on different levels upon turning movement of said cam.

17. In a manual and thermostatic switching device, a switch casing, a plurality of switches mounted in said casing, a thermal element carried by said switch casing and having a power member extensible upon predetermined rises in temperature, a cam having an annular cam face coaxial with the axis of said power member and moved along said casing in one direction by said power member upon extensible movement thereof, spring means moving said cam and power member along said casing in an opposite direction, a shaft coaxial with said cam and having driving engagement therewith for turning said cam upon turning movement of said shaft, two levers movable about a common axis, one riding on said cam and rocked thereby upon rectilinear movement thereof and the other having engagement with one of said switches for operating said switch upon rocking movement of said first lever, a spring connected between said levers and loaded to provide a positive drive connection between said levers under normal operating conditions, a plurality of additional cams spaced along said shaft and operated thereby upon turning movement thereof for operating other of said switches, a knob on said shaft for turning said shaft and first mentioned cam to the temperature range of operation of said first mentioned switch and to turn said second mentioned cams to open and close said other switches independently of said thermal operated switch.

References Cited in the file of this patent
UNITED STATES PATENTS

| | | |
|---|---|---|
| 2,526,234 | Huck | Oct. 17, 1950 |
| 2,597,823 | Rudd | May 20, 1952 |
| 2,598,563 | Konle et al. | May 27, 1952 |
| 2,671,839 | Cox | Mar. 9, 1954 |
| 2,699,481 | Ferris | Jan. 11, 1955 |
| 2,748,204 | Woods et al. | May 29, 1956 |